United States Patent [19]

Meacle

[11] 4,339,028

[45] Jul. 13, 1982

[54] METHOD AND APPARATUS FOR CHECKWEIGHING CONTAINERS

[75] Inventor: Thomas Meacle, Dun Laughaire, Ireland

[73] Assignee: Powers Manufacturing Co., Elmira, N.Y.

[21] Appl. No.: 819,305

[22] Filed: Jul. 27, 1977

[30] Foreign Application Priority Data

Oct. 13, 1976 [IE] Ireland .................................. 2256/76

[51] Int. Cl.$^3$ ...................... B65G 47/26; G01G 11/00
[52] U.S. Cl. .................................... 198/427; 198/429; 198/504; 65/160; 177/50; 177/60; 177/119; 177/145
[58] Field of Search ............... 198/426, 427, 429, 430, 198/504; 65/160; 209/121; 214/2; 177/50, 60, 116, 119, 145, 103, 104

[56] References Cited

U.S. PATENT DOCUMENTS

| 2,038,458 | 4/1936 | Von Segebaden et al. | 177/145 |
| 2,319,908 | 5/1943 | Walter | 198/504 |
| 3,184,031 | 5/1965 | Dunlap | 198/430 |

FOREIGN PATENT DOCUMENTS 368335 3/1932 United Kingdom .................. 65/160

Primary Examiner—Joseph E. Valenza
Attorney, Agent, or Firm—Seidel, Gonda, Goldhammer & Panitch

[57] ABSTRACT

This invention relates to a method and apparatus for the automatic checkweighing of containers during the process of their manufacture, and particularly relates to the checkweighing of hot glass bottles during their transmit from a molding machine to a lehr where they are annealed.

11 Claims, 4 Drawing Figures

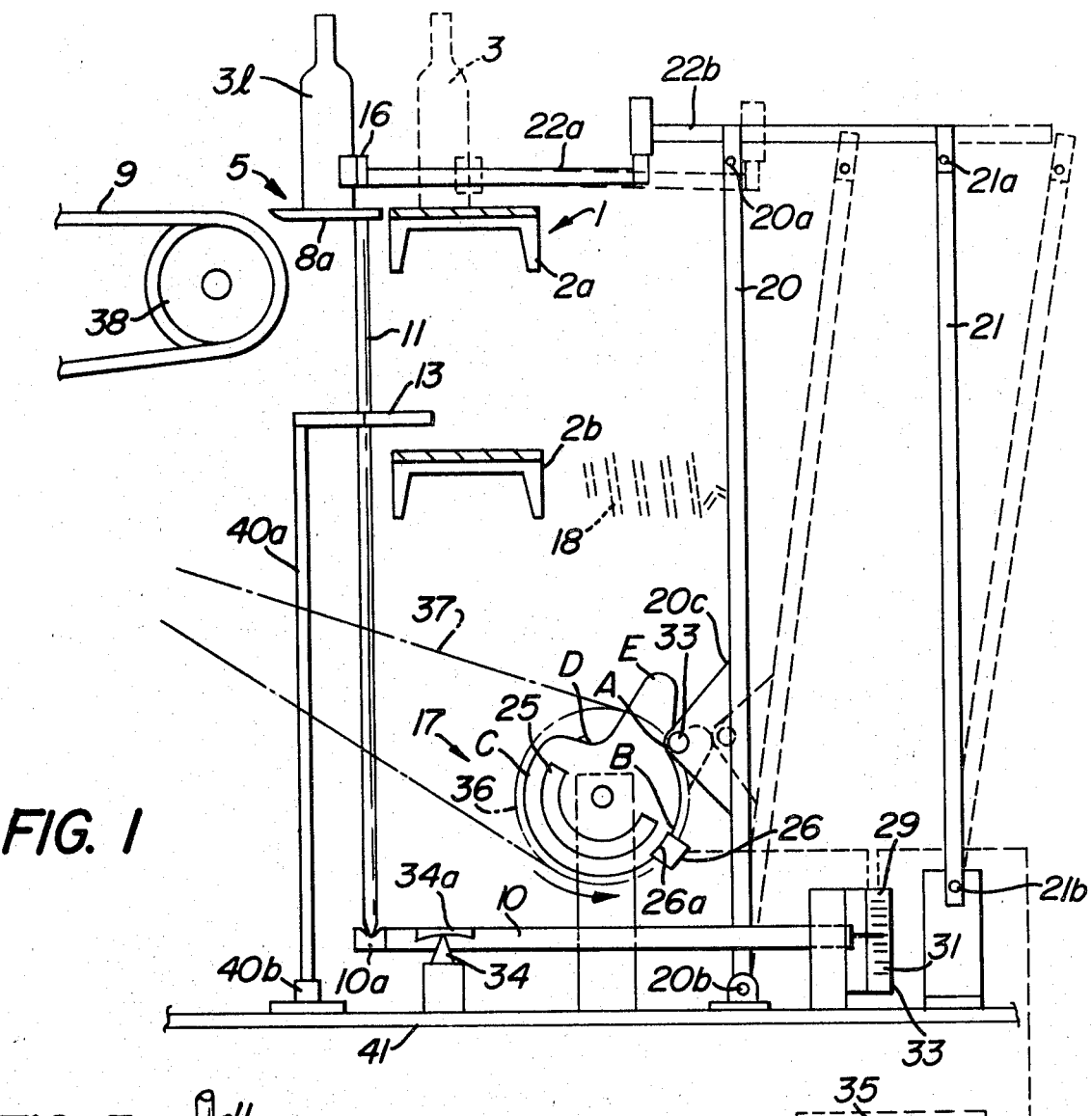
FIG. 1
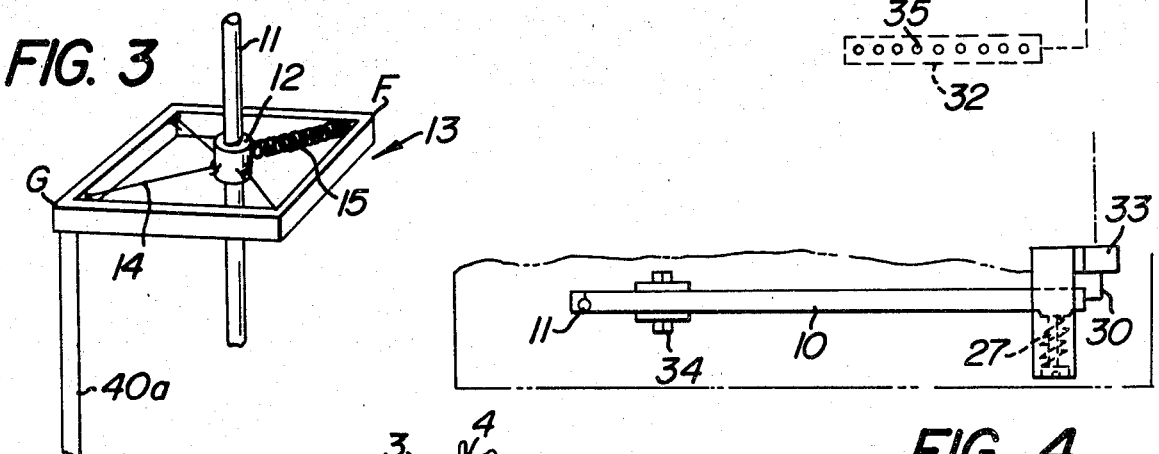
FIG. 3
FIG. 4
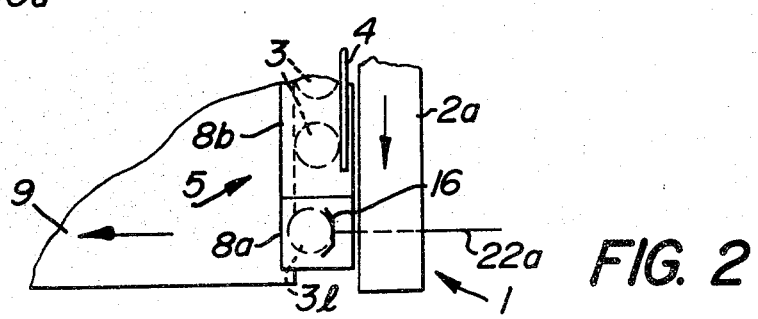
FIG. 2

METHOD AND APPARATUS FOR CHECKWEIGHING CONTAINERS

BACKGROUND

Checkweighing of glass bottles is important in that overweight bottles involve a waste of glass, and hold less liquid than they should. Underweight bottles contain more liquid than they should. Some glass forming processes require positive displacement of a known volume of glass to produce containers. Variations in weight change the volume of glass and many defects may result therefrom.

A known method of checkweighing involves manually removing one or two hot bottles from a conveyor perhaps three times an hour, weighing them, likewise manually, and then (frequently) discarding the weighed bottles since it is inconvenient to return them to the conveyor for transfer to the lehr.

Underweight or overweight bottles are an indication for appropriate adjustment of the gobs on the molding machines which dispense the molten glass to the molds.

Another known method of checkweighing involves an automatic weighing machine usually disposed on or adjacent to a molding machine. These known weighing machines suffer from two main disadvantages. Firstly, when a container is removed from a continuous flow of closely spaced hot glass bottles, no difficulty in product handling is encountered until after the weighing operation. At that point in time, product handling becomes a serious problem since another container must be removed from the flow of bottles to make room for the weighed container to be inserted in the flow. This manipulation has proven to be very difficult because of the speed and temperatures involved. Secondly, they are subject to the very heavy vibration of the molding or conveying machinery, and thirdly, the hot glass bottle is very close to the balance mechanism and is subjected to strong air currents in its immediate environment. All of these effects militate against accurate weighing.

The present invention seeks to overcome the above defects by providing weighing apparatus in which the hot glass bottle is isolated from vibrating machinery while it is being weighed, and in which the hot glass bottle is remote from the more sensitive elements of the weighing apparatus and is subjected to negligible air currents. Moreover, the present invention permits the bottles, after weighing, to continue in the transfer path to the lehr for annealing, thus avoiding bottle wastage.

SUMMARY OF THE INVENTION

The apparatus includes a delivery conveyor for conveying containers in a row in a first direction. A lehr conveyor is provided for receiving the containers and for conveying them in a direction generally perpendicular to the first direction. A platform is provided between and adjacent said conveyors. A transfer means is provided for simultaneously transferring a plurality of containers off the delivery conveyor, across the platform, and to the lehr conveyor. A weighing means is provided in association with the platform for weighing at least one container before the container is received onto the lehr conveyor.

For the purpose of illustrating the invention, there is shown in the drawings a form which is presently preferred; it being understood, however, that this invention is not limited to the precise arrangements and instrumentalities shown.

FIG. 1 is an elevational view of the checkweighting apparatus.

FIG. 2 is a plan view of part of FIG. 1 showing the weighing platform.

FIG. 3 is a perspective view of a detail of the apparatus of FIG. 1.

FIG. 4 is a plan view of another detail of the apparatus of FIG. 1.

Referring to the drawings in detail wherein like numerals indicate like elements, an endless conveyor 1 has upper and lower runs 2a and 2b and transfers hot glass bottles 3 from a molding machine, not shown, to a position alongside a platform 5. In this embodiment, a row comprising a fixed number (24) of bottles 3 is transferred alongside the platform on conveyor 1 which is continuously moving.

The platform 5 is opposite a conveyor 9 which transports the bottles through a lehr, not shown, and, as described later, the bottles 3 are pushed from the conveyor run 2a onto the platform 5 and then onto the conveyor 9, the leading bottle 31 of the row being subject to checkweighing while on the platform prior to transfer of the bottle to the conveyor 9. The conveyor 9 runs on a roller 38 called the front lehr roller.

The platform 5 comprises two parts, a smaller part 8a, constituting the weighing pan of a balance, for receiving the leading bottle 31 from the batch, and a larger part 8b for receiving the remaining 23 bottles. A push member 4 transfers the 23 bottles from the conveyor 1 to the platform part 8b and then to the conveyor 9, this push member being operated by any suitable means for example, by the driving mechanism of the molding machine conveyor.

The leading bottle 31 is transferred to the platform part 8a and then to the conveyor 9 by a push member 16 secured to an arm 22 fixed to an arm 22b, the latter arm being pivotally connected at 20a, 21a to levers 20, 21. The lower ends of the levers 20 and 21 are pivotally mounted at 20b, 21b. The pivotal mounting 21b is higher than the mounting 20b so that the push member 16 moves in an approximately horizontal plane. Movement of the assembly 16, 22a, 22b, 20 and 21 about the pivots 20b and 21b is controlled by a cam 17 which engages a cam follower 33 carried by a bracket 20c on the lever 20, the cam follower being held in engagement with the cam by a tension spring 18 acting on the lever 20. In FIG. 1, the dashlines represent the positions of the parts when the bottle 31 is on the conveyor 1 and the solid lines the positions when the bottle is on the platform part 8a.

The cam 17 rotates counterclockwise as viewed in FIG. 1 and is driven from the driving mechanism of the molding machine conveyor by a chain 37 and sprocket 36. During movement of the follower 33 along the cam periphery from E to A the bottle 31 is transferred on to the platform part 8a constituting the weighing pan. Between points A and B the push member 16 retracts about ¼ inch to allow the bottle 31 to stand freely on the platform part 8a. The following dwell period provided by the cam periphery extending from B to C enables the balance to come to an equilibrium position upon transfer of the bottle to the pan. At the end of the dwell period provided by the cam at point C, the bottle 31 is weighed as described later and following this period the bottle is transferred to the conveyor 9 by movement of the follower 33 along the cam periphery C to D. Finally, the parts 20, 21, 22a and b are retracted to the dash-line positions when the cam follower traverses the cam periphery from D to E. It will be obvious that the cam 17 is arranged to make one revolution during the transfer of each row of bottles 3 to the lehr.

The balance comprises a pan formed by the platform part 8a connected by light tube 11 to a knife edge 10a on a balance beam 10 supported on a knife edge 34 on a floor 41. The tube 11 is guided for vertical movement by a collar 12, FIG. 3, supported in a frame 13 by three wire links 14 and a light tension spring 15. The frame 13 is positioned in such manner that the movement of the bottle 31 on to the pan 8a takes place in the direction along the diagonal G to F so that the wire link 14 opposite spring 15 compensates the lateral force introduced by the bottle movement. As there is no lateral force in the opposite direction a very weak tension spring 15 is provided, to reduce the frictional resistance to vertical movement of tube 11 to a engligible value. The frame 13 is mounted by a rod 40a in a stand 40b on the floor 41.

The balance beam 10, in addition to the usual displaceable weights for zero and sensitivity adjustment, carries at its right-hand end, as viewed in FIG. 1, an electrical bridging contact-tip 30, FIG. 4, which can make contact with any one of a plurality of contact strips 31 mounted on a base 33 in a vertical row and forming a scale 29. Each strip 31 has a gap and the tip 30 can bridge the gap to complete a circuit and energize a corresponding indicator bulb 35 in a display case 32. As shown, there are nine strips 31 and nine bulbs 35. The center bulb 35, corresponding to the center strip 31, is yellow and indicates that the glass bottle 31 has the correct weight, the bulbs to one side of the center being red and indicating overweight and those to the other side of the center being blue and indicating underweight. The display case 32 may be fixed to a wall remote from the weighing apparatus but in full view of the molding machine operator who can thus observe a weight signal on every 24th bottle made and adjust his machine accordingly.

The bridging contact tip 30 is moved horizontally towards the base 33 (i.e., upwardly in the plane of the paper in FIG. 4) to bridge the gap of a contact strip 31 by energization of a solenoid 27 controlled by a switch 26. The distance travelled by the contact tip 30 is very small; it may be 1 mm or less. The switch 26 is operated by an inner arcuate surface 25 of the cam 17 extending over the angular distance from B to C, the surface 25 engaging a switch actuating member 26a so that the switch is closed to energize the solenoid and maintain it energized while the cam follower 33 moves from B to C. The knife edge 34 cooperates with a hard plate 34a which is shaped or doubly chamfered to give a stable position to which the knife edge 34 reverts under gravity after small displacements from said position, such as the small angular displacement effected by the action of the solenoid 27. The solenoid 27 is spring biased into a resting position to which it reverts when de-energized, whereby the beam 20 is freed.

In a modification, not shown, two or three platform parts or weighing pans 8a are provided and arranged side by side and the weighing apparatus and indicating apparatus are duplicated or triplicated. In this method, the leading two or three bottles out of each row of (say) 24 bottles are checkweighed, and the remaining 22 or 21 bottles are received on the platform part 8b.

It will be noted that the overall length of the platform 5 is not affected by the weighing apparatus and that no modification is necessary to the conveyor 9.

The push members 4 and 16 may be operated simultaneously to transfer all of the 24 bottles 3 at the same time from the conveyor 1 to the platform 5 and the push member 4 may continue to push the 23, 22 or 21 unweighed bottles on the conveyor 9, the leading bottle or bottles 31 being pushed, after a short weighing interval, by the push member 16 on to the conveyor 9. Alternatively, there may be a pause in the operation of the push member 4 and all 24 bottles may be transferred together from the platform 5 to the conveyor 9.

Since the frame 13 and the balance beam 10 are both mounted on the floor 41, they are not subjected to vibrations of the machinery. It is apparent therefore that the invention overcomes the deficiencies of the prior art stated above.

The weight readings can be subsequently processed to give a strip chart recording of weight and can also be used to effect automatic molten glass feed control with consequently automatically controlled container weight. It will be apparent that a weigh cell or the like may be substituted for the balance beam 10.

The present invention may be embodied in other specific forms without departing from the spirit or essential attributes thereof and, accordingly, reference should be made to the appended claims, rather than to the foregoing specification as indicating the scope of the invention.

I claim:
1. Apparatus comprising:
   (a) a delivery conveyor for conveying glass containers in a row in a first direction,
   (b) a lehr conveyor for receiving glass containers and conveying them in a direction away from and generally perpendicular to said delivery conveyor,
   (c) a platform adjacent and between said conveyors, said platform being comprised of at least two portions, one portion of said platform being the pan of a weighing means,
   (d) a transfer means for simultaneously transferring a plurality of glass containers off said delivery conveyor, across said platform, and to said lehr conveyor, and
   (e) weighing means associated with said one platform portion weighing at least one container supported by said one platform portion before said containers are transferred as a row from the platform onto the lehr conveyor.
2. Apparatus in accordance with claim 1 wherein said weighing means is supported in a manner so as to be free from vibrations of said transfer means and conveyors, and said weighing means including an indicator for indicating the weight of said one container on said one platform portion.
3. Apparatus in accordance with claim 2 wherein said indicating means includes a plurality of lights one of which is lit as a function of the weight of said one container.
4. Apparatus in accordance with claim 1 wherein said transfer means includes a pusher generally parallel to said first direction and coupled to a cam for reciprocating the pusher in timed relationship with the arrival of glass containers on said delivery conveyor.
5. Apparatus in accordance with claim 1 wherin said weighing means is a balance scale supported by the floor below the elevation of said delivery conveyor and connected by a vertically disposed member to a pan which is located at the elevation of said platform and forms a part of said platform.

6. Apparatus in accordance with claim 1 wherein the one container is the leading container of the row of containers on said delivery conveyor, said transfer means including a pusher for pushing the leading container in the row on the delivery conveyor, and means for causing said pusher to lose contact with the leading container for a short period of time while the leading container is on the platform and being weighed, and said pan being located to receive the leading container.

7. A method comprising the steps of:
   (a) conveying a row of containers on a delivery conveyor in a first direction,
   (b) providing a lehr conveyor for receiving containers from the delivery conveyor and for conveying them in a direction away from said delivery conveyor,
   (c) providing a platform means adjacent and between said conveyors,
   (d) simultaneously transferring a plurality of containers in a row off the delivery conveyor, across said platform means to said lehr conveyor, and
   (e) weighing at least one but substantially less than all of the containers while containers are in a row on said platform means and before said containers are receiving onto the lehr conveyor.

8. A method in accordance with claim 7 wherein said containers are hot glass bottles, said step of simultaneously transferring including pushing a plurality of hot glass bottles off the delivery conveyor, across said platform, to said lehr conveyor.

9. A method in accordance with claim 7 wherein said step of weighing the containers includes using a weighing means supported by the floor and which indicates whether the container is above or below a predetermined norm.

10. A method in accordance with claim 7 wherein the container weighed is the leading container of the row of containers on said first conveyor.

11. A method in accordance with claim 8 wherein said pushing step includes interrupting contact between the pusher and said one bottle as said one bottle is being weighed.

* * * * *